No. 731,212. PATENTED JUNE 16, 1903.
E. J. PACE.
HOSE COUPLING.
APPLICATION FILED MAR. 19, 1903.
NO MODEL.
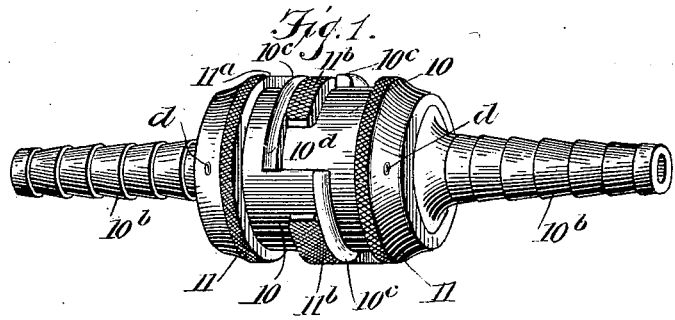
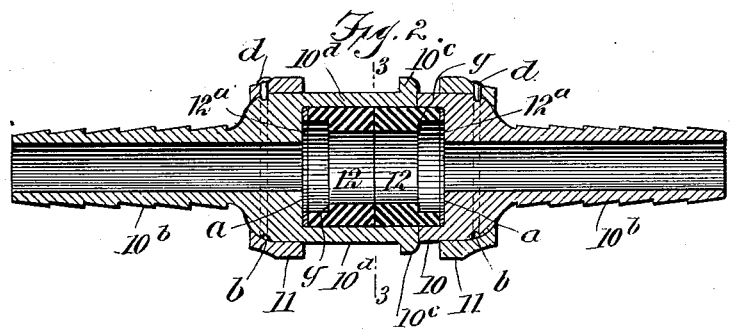
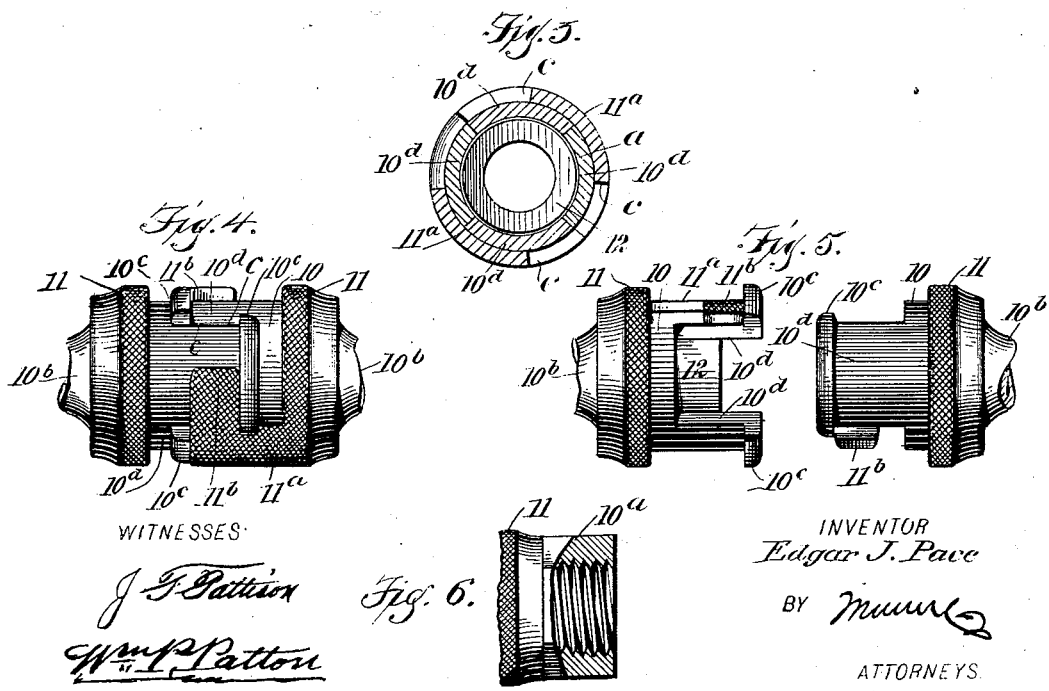
WITNESSES
INVENTOR
Edgar J. Pace
BY
ATTORNEYS No. 731,212. Patented June 16, 1903.

UNITED STATES PATENT OFFICE.

EDGAR J. PACE, OF SALEM, OHIO, ASSIGNOR OF ONE-HALF TO WILLIAM G. HARD AND DORA J. HARD, OF SALEM, OHIO.

HOSE-COUPLING.

SPECIFICATION forming part of Letters Patent No. 731,212, dated June 16, 1903.

Application filed March 19, 1903. Serial No. 148,567. (No model.)

*To all whom it may concern:*

Be it known that I, EDGAR J. PACE, a subject of the Czar of Russia, and a resident of Salem, in the county of Columbiana and State of Ohio, have invented a new and Improved Hose-Coupling, of which the following is a full, clear, and exact description.

The objects of this invention are to provide a coupling for water, steam, or air conducting hose which has novel duplicate connecting-sections, is very simple, easy to connect and detach, is reliable in service, and is light, strong, durable, and of shapely design, and has no projections from its general surface.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the improved hose-coupling arranged to connect the ends of two hose-sections having small diameter. Fig. 2 is a longitudinal axial sectional view of the coupling in coupled adjustment. Fig. 3 is a transverse sectional view substantially on the line 3 3 in Fig. 2. Fig. 4 is a side view of the improved coupling seen at a different point from that represented in Fig. 1. Fig. 5 is a side view showing the two coupling-sections detached and the locking members adjusted to permit the sliding engagement of said sections; and Fig. 6 is a side view of a portion of one coupling-section, showing a socket-nut therefor to adapt said section for screwed engagement with a water-hydrant or fire-plug.

The two sections of the hose-coupling being duplicates one of the other, a description of the specific construction of one coupling-section will be sufficient for both, and, as shown, each coupling-section is constructed as follows: The body 10 is externally cylindrical and concentrically cupped, as shown at $a$ in Figs. 2 and 3, this circularly-walled cup having a flat true bottom surface. The portion of the body 10 adjacent to the bottom surface of the cupped recess $a$ is peripherally grooved at a suitable point and from the groove $b$ is extended either to have an integral socket-nut $10^a$ formed thereon, as represented in Fig. 6, for a coupled connection with a male screw on a water-hydrant or a fire-plug outlet-nozzle or to have an elongated hollow stem $10^b$ formed thereon to enable an end portion of a hose-section to be securely connected therewith by an insertion of the stem therein and a subsequent application of any preferred constricting means upon the exterior of the hose to bind it upon the inserted stem in the usual way for connecting sectional hose-couplings upon hose.

Upon the opposite end of the hollow body 10 a circumferential flange $10^c$ is radially formed, and at opposite points two similar rectangular openings are produced in the cylindrical wall of the body, said openings that cut through the flange $10^c$ being each defined in width by the parallel side edges $c$ on the material left remaining. Each of the openings mentioned extends an equal distance from the flange $10^c$ toward the bottom of the recess $a$, preferably somewhat in excess of half the depth of said recess. It will be seen that the material that remains integral with the cylindrical wall of the recess $a$ forms two similar wings $10^d$, that are respectively defined in breadth by the edges $c$, these similar wings having such proportionate breadth as will permit the wings on one coupling-section to slide loosely between the edges $c$ on a mating-section occupying the opposite openings therein that extend between said edges.

As shown in Figs. 1 and 4, the circumferential flanges $10^c$ on the free ends of the wings $10^d$ will impinge upon the bottom edges of the rectangular openings said wings occupy when the coupling-sections are slid together, this impingement of one section on the other determining the extent of such a sliding engagement of parts. Upon the cylindrical portion of the body 10, wherein the peripheral groove $b$ is formed, a sleeve 11 is loosely mounted and held thereon by a detent screw or pin $d$, whereby the sleeve is permitted to receive rotatable adjustment. As shown in Fig. 2, each sleeve 11 is furnished with an integral depending flange that contacts with the end wall of the body 10 and receives the strain that would be imposed upon the pin $d$ during the operation of coupling the two sections of the coupling together, as will be hereinafter explained.

Upon the inner edge of each sleeve 11 or the edge disposed nearest the flange 10ᶜ on the wing 10ᵈ an L-shaped clutch-hook is integrally formed, consisting of a member 11ᵃ, that projects across the recessed portion of the body 10, of suitable width and length, and having parallel side edges disposed at a right angle to the inner edge of the sleeve from which said member projects. Upon the hook portion 11ᵃ, that may be termed the "shank" member, at and near the free end thereof, a clutching member 11ᵇ is formed, that projects from a side edge of the shank member 11ᵃ, said clutching member, which with the shank member forms a right-angular bent hook, having parallel edges and proper width for effective service, as will presently be explained.

In the cupped recess $a$, formed in each body 10 of the hose-coupling, an elastic joint-ring 12 is inserted. The joint-rings 12 are internally enlarged to increase the diameter of the bore or passage therethrough at and near the end of each joint-ring, which seats upon the bottom of the cupped recess $a$. The flanges 10ᶜ on the wings 10ᵈ of each body 10 become spaced apart when the wings on one half-section of the hose-coupling are slid in the rectangular openings between the similar wings 10ᵈ on the other half-section, said spaces having sufficient width to permit the slidable insertion of the free ends of the clutching members 11ᵇ between respective pairs of the flanges 10ᶜ when said flanges contact with the bottom edges of the rectangular openings between the wings 10ᵈ.

Assuming that the half-sections of the hose-coupling have been engaged with each other, as stated, the length of the elastic cylindrical joint-rings is such that if their approaching ends have contact the spaces between the flange 10ᶜ will be somewhat contracted, and a compression of the joint-rings endwise is necessary to permit the free ends of the clutch members 11ᵇ to be inserted between respective pairs of the flanges 10ᶜ. To facilitate the introduction of the free ends of the clutching members 11ᵇ between pairs of the flanges 10ᶜ, the side edges at said ends are sloped, so as to give them wedge shape. To enable the sleeves 11 to be conveniently manipulated for their rotatable adjustment upon the body-pieces 10, the exterior surfaces of the sleeves and clutch-hooks are roughened by cross-checking them, as shown, or by other means.

To couple together two similar sections of the improved hose-coupling, the wings 10ᵈ of one half-section are inserted between the defining side edges of the like wings on the other half-section, and said coupling-sections are pressed toward each other with sufficient force to contract the impinged joint-rings 12, so that the free sloped ends of the clutch-hook members 11ᵇ may be introduced between the adjacent ends of a respective pair of spaced flanges 10ᶜ by a rotatable movement of the sleeve 11 whereon said hooks are formed.

It will be seen that the compression of the elastic joint-rings 12 due to a complete insertion of the hook members 11ᵇ between the pairs of spaced flanges 10ᶜ will afford a fluid or liquid straightway-passage through the coupling-sections that will not leak. The counterboring of the end portions of the pair of joint-rings 12 at the ends which seat upon the bottom walls of the cupped chambers $a$ in the coupling-bodies 10 affords in each ring an annular shoulder $g$, that defines the depth of the counterbore, and it will be seen that pressure on said shoulders of liquid or fluid passing through the hose and coupling will aid in enforcing an air or liquid tight contact of the impinged joint-rings at their meeting ends.

If at any time the joint-rings 12 should need increased pressure on each other to insure a tight joint between them, one or more reinforcing-washers 12ᵃ may be inserted in the recesses $a$ below the joint-rings, so as to reduce the depth of the cupped recesses $a$ and obviously cause the joint-rings to bear more forcibly upon each other.

To disconnect the two half-sections of the improved coupling, it is only necessary to grasp the sleeves 11 and turn them in a proper direction for a removal of the clutch-hook members 11ᵇ from between the flanges 10ᶜ, which will dispose the wings 10ᵈ in the openings between the wings, and thus permit a free longitudinal movement of the wings from each other for a detachment of the half-sections of the hose-coupling.

Having thus described my invention, I claim as new and desire to secure by Letters Patent—

1. A hose-coupling, comprising two similar sections each having a cylindrical body recessed from one end toward the other, forming a circular wall, two like coupling-wings formed on the circular wall by providing opposite rectangular openings therein, a radial locking-flange on the free end of each wing, an elongated joint-ring seated in the recess of the body, a sleeve held to rotate on the body, and formed with an L-shaped clutch-hook rotatable upon the wings in contact with one edge of a respective wing, and means for securing the coupling-sections on a hose.

2. A hose-coupling, comprising two similar sections, each having a cylindrical body-piece recessed from one end toward the other, forming a circular wall, two like coupling-wings formed on the circular wall by providing opposite openings therein slightly wider than the wings, a radial locking-flange on the free end of each wing, an elongated cylindrical joint-ring counterbored at one end to form an annular shoulder therein, and seated in the recess of the body-piece, a sleeve held to rotate on the body-piece at the end opposite from the radial flanges thereon, two L-shaped spaced clutch-hooks integral with the sleeves, the free ends of said hooks having sloped edges to give them wedge form, said sleeves and hooks being rotatable upon the body-pieces and wings, the ends of the hooks contacting with the sides of the radial flanges, and a hollow stem projected from each body-piece for connection with a hose-section.

In testimony whereof I have signed my name to this specification in the presence of two subscribing witnesses.

EDGAR J. PACE.

Witnesses:
DORA J. HARD,
W. S. EMMONS.